United States Patent [19]

Kluczynski et al.

[11] 4,333,615
[45] Jun. 8, 1982

[54] FILM CASSETTE FOR ROLL FILMS

[75] Inventors: Achim Kluczynski, Overath; Erik Altmann, Muelheim an der Ruhr, both of Fed. Rep. of Germany

[73] Assignee: AGFA-Gevaert AG, Leverkusen, Fed. Rep. of Germany

[21] Appl. No.: 183,055

[22] Filed: Sep. 2, 1980

[30] Foreign Application Priority Data

Sep. 5, 1979 [DE] Fed. Rep. of Germany ....... 2935774

[51] Int. Cl.³ .............................................. G03B 1/04
[52] U.S. Cl. ................................. 242/71.1; 242/71.7
[58] Field of Search ................ 242/71.1, 71, 71.7, 242/197; 206/387, 389, 408, 409, 413–416

[56] References Cited

U.S. PATENT DOCUMENTS

| 2,172,255 | 9/1939 | Nagel | 242/71.1 |
| 2,519,753 | 8/1950 | Goodhand | 242/71.1 |
| 3,128,058 | 4/1964 | Ringle | 242/71.1 |
| 3,945,584 | 3/1976 | Margan | 242/71.1 |

FOREIGN PATENT DOCUMENTS 1248463 10/1964 Fed. Rep. of Germany ..... 242/71.1

*Primary Examiner*—Edward J. McCarthy
*Attorney, Agent, or Firm*—Connolly and Hutz

[57] ABSTRACT

The invention relates to a cassette for roll films, in particular for miniature films, consisting of a cylindrical container as the film storage chamber, a film exit slot formed thereon and a film spool whereby at least one edge of the cylindrical container is turned inwards to increase the impermeability to light, the slot comprises strips bent downwards at its lateral ends to define the width of the slot and at least one closure element is formed onto the cassette container overlapping the deformed container edge and laterally closing the cassette slot.

8 Claims, 3 Drawing Figures

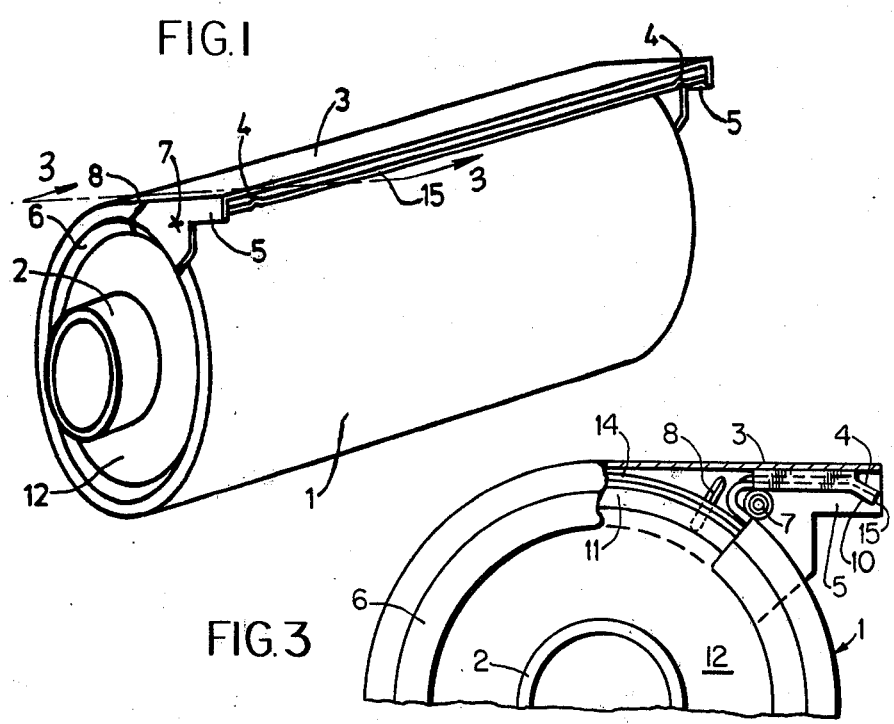
FIG. 1
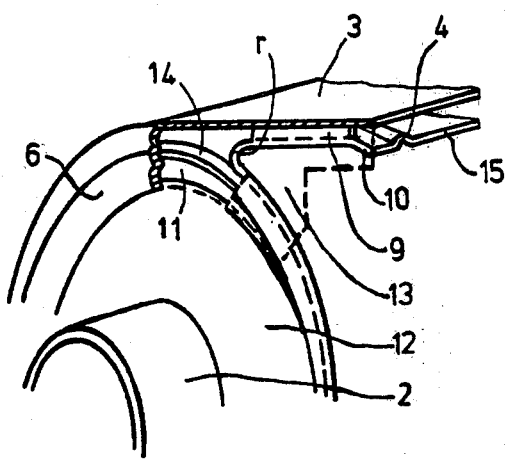
FIG. 3
FIG. 2

FILM CASSETTE FOR ROLL FILMS

This invention relates to a film cassette for roll films, more particularly for miniature films, consisting of a cylindrical container as the film storage chamber, a cassette exit slot formed thereon and a film spool.

In the field of photosensitive film materials, different film cassettes are used for different film systems, such as for example for narrow films or miniature films. In these cassettes, the film material is wound onto spools, after which the spools with the films wound thereon are introduced into the cassette which is then closed in light impermeable manner. The cassettes comprise openings through which the film material may be off-wound or wound in. There is a distinction between motion-picture cassettes and still-picture cassettes. The type of cassette under discussion here is exclusively a roll film cassette for still-picture film and, more particularly, for the miniature film system for 35 mm wide film material. These cassettes for miniature films normally consist of a rolled, lacquered sheet-metal container comprising a film exit slot. At either end, the sheet metal container is closed by covers after a spool loaded with film has been introduced. Sealing materials, for example strips of velvet, are bonded into the film exit slot to trap light. At either end the spools are mounted in the covers by means of plugs in such a way that light is trapped as effectively as possible. Accordingly, these cassettes consist of a spool, three parts and the two strips of velvet to be bonded in. These cassettes are attended by the further disadvantage that the film exit slot of the cassette cannot be completely sealed off, particularly at its two ends adjacent to the covers. The cooperation between different diameters of the cassette container and covers and the closure devices provided thereon, such as beads, lugs, pins, produces fairly considerable dimensional differences in the container diameter and hence in the width of the film entry and exit slot. Accordingly, if the slot is too wide, light is not properly trapped whereas, if it is too narrow, too much force has to be applied to withdraw the film. In either case, the film may be damaged or even rendered useless. The covers perform the dual function of protecting the inserted film on the spool against light and, at the same time, ensuring the cylindrical form of the container. The covers snapped into position on the cylindrical container can easily become loose and spring off, as a result of which light enters the cassette and spoils the film.

A roll film cassette of the type described for example in German Offenlegungsschrift No. 2,612,352 has fewer parts.

The cassette is made of plastic and the cylindrical container is formed integrally with a base, so that only one cover has to be fitted on. The cover engages in the cylindrical container through spring studs. In one particular embodiment, the cover engaged in the cylindrical container may additionally be welded to the lower part of the cassette. Although the cover is thus prevented from springing off, the difficulties of light-trapping the container caused by the dimensional tolerances of cover and cassette container still exist on the cover side. Further difficulties arise when the sealing strips are introduced into the container slot which, at its lower end, is held together by the integrally formed base, making it difficult to glue or bond the strips in the exact position required.

U.S. Pat. No. 3,482,797 describes a film cartridge which is made of sheet metal or plastic and which comprises a container with an integral base similar to the plastic cassette described above. The cover is replaced by one of the spool flanges, specially reinforced, which turns in the grooves stamped into the cassette container. Two grooves in the cassette container and two ribs formed by injection moulding on the circumference of the spool flange replace the cover in sealing off the interior of the cassette against the entry of light. Since even slight bending apart of the container on the open side is sufficient to expose the film in the cassette, this type of cassette has never been successfully marketed.

The object of the present invention is to provide a cassette which can be produced inexpensively taking into account established standards in regard to form and compatability, affords effective protection against light whilst at the same time providing for effortless off-winding and on-winding, is suitable for automatic cameras and may be used universally for miniature-film cameras.

According to the invention, this object is achieved in that at least one edge of the cylindrical container is turned inwards to increase the impermeability to light of the film storage chamber, in that, at its lateral ends, the cassette slot comprises downwardly angled strips to define the width of the slot and in that at least one closure element is formed on the cassette container, overlapping the inwardly turned edge of the container and laterally closing the cassette slot.

One particularly advantageous and inexpensive embodiment is distinguished by the fact that, after the spool has been inserted, both edges of the container are turned inwards.

It has surprisingly been found that this cassette which consists of only two parts, the cassette container and the film spool, and which is therefore very inexpensive to produce and approximately 30% cheaper than conventional cassettes, shows both excellent running properties for the spool in the cassette and also very good impermeability to light. The impermeability to light and also the good off-winding and on-winding properties for the film are obtained by the strips which define the width of the slot and which make it possible for the width of the slot to be selected in advance. The closure element prevents light from laterally entering the slot and reinforces the cassette and the position of the slot relative to the container.

According to the invention, the edge of the cassette container may also be turned in on only one side of the cassette, in which case a cover may be used as closure on the other side.

In one particularly advantageous embodiment for preventing light from entering the cassette at the sides of the spool flanges, the edge(s) of the container are co-axially deformed towards the interior of the container and spools are provided, the flanges of which are provided around their outer periphery with a conical collar corresponding to the conical form of the container edge.

This conical collar around the spool, together with the inwardly directed conical deformation of the container edge, further improves impermeability to light by lengthening and angling the light path.

To improve the stability of the cassette and to increase its impermeability to light, the closure element is provided with beads in the region of the slot.

To ensure that the film is treated carefully in the image region, one special embodiment is distinguished by the fact that the lower lip is provided with ridges projecting towards the upper lip on which the image-free edge of the film slides.

The film is made easier to off-wind from and on-wind into the cassette by bending one or both lips of the slot in the form of a funnel.

The cassette may be made of sheet iron, sheet aluminium or other metal or metal alloys. To increase impermeability to light, the metal sheets are painted black.

The cassette may also be made of a light-impermeable thermoplastic plastic such as, for example, polystyrene, polyurethane, cellulose esters, polycarbonate or acrylonitrile-butadienestyrene copolymers.

The invention is described in more detail in the following with reference to the accompanying drawings, in which, FIG. 1 is a pictorial view of the cassette with the spool inserted.

FIG. 2 is an enlarged fragmental pictorial view showing parts of the cassette in cross-section in the region of one of the lips, and FIG. 3 is an enlarged partial cross-sectional view taken through FIG. 1 along line 3—3 illustrating a fragmental portion also shown in FIG. 2.

FIG. 1 shows the complete cassette which consists of only two parts, namely the cylindrical container 1 and the inserted spool 2. The container 1 is rolled from sheet metal or injection-moulded or formed from plastic. In the production of the container 1, the entry and exit slot, consisting of the upper lip 3 and the lower lip 15, is formed onto the container 1. The container 1 is longer than the eventual cassette. To seal off the interior against light, the edges of 6 of the container 1—after the spool 2 has been inserted—are first turned radially inwards through 90° and then deformed conically towards the interior of the cassette. In another method of production, the edge of 6 the container 1 may first be deformed in the manner described on only one side of the cassette, the spool 2 subsequently introduced and then the other edge 6 of the container 1 deformed. Instead of deforming the second edge 6, it is also possible in known manner to fit a cover on one side.

For reasons of cost, the spool 2 is generally made of plastic, although the cassette may also be fitted with metal spools. Spools with catching hooks are particularly suitable. In their case, the film—on insertion through the slot (3,15)—is taken up by the hooks of the spool, which engage in its lateral or central perforations, and is wound in by the spool. Spools such as these with catching hooks are described for example in German Pat. No. 1,190,785, the catching hooks being arranged in a slot in the shaft of the spool. To thread the beginning of the film into the spool slot, the spool slot has to be brought into a defined position relative to the cassette slot.

It is of advantage to use a so-called outer hook spool which comprises a catching hook on the periphery of the spool shaft and which catches, holds and winds on a film inserted through the slot, even when the spool is rotating. A film spool of this type is described for example in U.S. Pat. No. 4,181,271.

To increase impermeability to light, the spool flanges 12 of the spool 2 (FIG. 2) are provided around their periphery with a conical collar 11 which corresponds in its conical form to the conical deformation of the edges 6 of the cassette container 1. In this way, light impinging in the spool flange is deflected through an angle of greater than 90°, guided between the spool flange and the edge of the container and is then deflected through another 90° so that it is unable to enter the cassette. Providing both the cassette container and the spool are black in colour, no light is able to enter the cassette from the sides, thus preventing the film material from being exposed.

A strip 9 is punched free at either end of the lower lip 15 of the cassette slot, its width in the axial direction being gauged in such a way that, when it is turned upwards, it forms a support for the upper lip 3 and ensures a specified distance between the upper lip 3 and the lower lip 15.

The possibility of adjusting the width of the slot exactly makes it possible for the cassette slot to be left without any sealing material, such as bonded strips of velvet, for non-sensitive films or films with a bias. For highly sensitive films, however, the upper lip 3 and/or the lower lip 15 may also be provided with a strip of sealing material.

To ensure that the film is carefully guided through the gap between the upper lip 3 and the lower lip 15, inwardly projecting sliding surfaces 4, such as beads or raised surfaces projecting into the slot, may be provided at both ends of the lower lip 15, supporting the film at its edges in such a way that the image area of the film is untouched and is not damaged during off-winding and on-winding. The upper lip 3 and/or the lower lip 15 may be provided towards the front with a bend 13 which, similar to a funnel, makes the film easier to thread into the cassette.

At either end of the upper lip 3, there are closure elements 5 which laterally close the cassette slot (3,15) when the container edges 6 are deformed.

In the region 13 (FIG. 2), the container edges 6 overlap one another to keep the cassette impermeable to light at this point. At the same time, the closure element 5 increases the stability of the cassette slot and of the cassette itself against deformation. The formation of beads 7, 8 further improves stability, prevents the lower lip 15 from moving relative to the upper lip 3 and fixes the cylindrical form of the cassette container 1, as shown in FIG. 3.

When the film is being on-wound and off-wound, the spool 2 is held in position radially by rotation of the outer flange diameter 14 of the spool 2 on the inner cylindrical wall of the cassette container 1.

The transition from the cylindrical cassette container 1 to the lower lip 15 has a radius r which does not offer any resistance to the rotation of the spool in this region and which guides the film without damage from the spool 2 into the cassette slot 3, 15, especially since the beads 4 are able to expand into this region and guide the film only at its image-free edges.

The described cassette shows significant advances over hitherto known cassettes. It consists of only two parts, namely the cassette container and the spool, and is therefore very inexpensive to produce. Its lateral impermeability to light is guaranteed by the conical deformation of the two ends of the cassette container and the conical configuration of the collar on the outer spool flange. The provision of the cassette slot with spacer strips at both ends and the closure elements provides for a light-impermeable construction and, at the same time, makes it possible for the film to be readily on-wound and off-wound. There is no question of covers springing off accidentally and, hence, no danger of the film being spoiled by premature exposure.

We claim:

1. A film cassette for roll films, in particular for miniature films, consisting of a cylindrical container as the film storage chamber, a film exit slot formed thereon and containing a film spool, at least one flange provided on the spool comprising on its outer circumference a conical collar wherein at least one edge of the cylindrical container is turned inwards to increase the impermeability to light of the film storage chamber and constructed so that the flange of the film spool is contained therein, the outer flange diameter of the spool and the inner wall of the container being positioned to hold the spool radially in position, and wherein the cassette slot comprises strips bent downwards at its lateral ends to define the width of the slot and in that at least one closure element is formed onto the cassette container overlapping the deformed container edge and laterally closing the cassette slot.

2. A film cassette as claimed in claim 1, characterised in that the edge of the container is turned inwards on only one side of the cassette and the other side is closed by a cover.

3. A film cassette as claimed in claim 1 wherein the edge of the container is conically deformed towards the interior of the container and the flanges provided on the spool corresponding to the conical form of the container edge.

4. A film cassette as claimed in claim 1, wherein a closure element is provided with beads to stabilise the cassette and to increase its impermeability to light in the region of the slot.

5. A film cassette as claimed in claim 1, characterised in that the lower lip of the cassette slot comprises raised edges at both ends to leave the image surfaces of the minature films untouched.

6. A film cassette as claimed in claim 1, characterised in that the lips of the slot are provided with funnel-like bends at their front edges to make the film easier to off-wind and on-wind.

7. A film cassette as claimed in claim 1, characterised in that the container is made of metal.

8. A film cassette as claimed in claim 1, characterised in that the container is made of a light-impermeable plastic.

* * * * *